Aug. 26, 1930.　　　A. G. TAFLAN　　　1,773,889
AEROPLANE
Filed Oct. 25, 1929　　　3 Sheets-Sheet 1
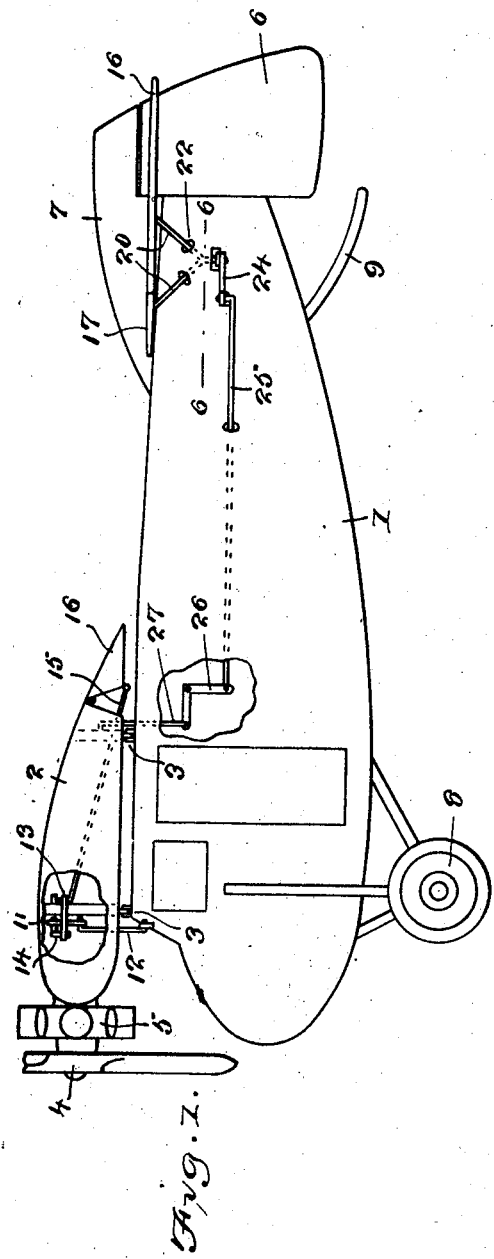
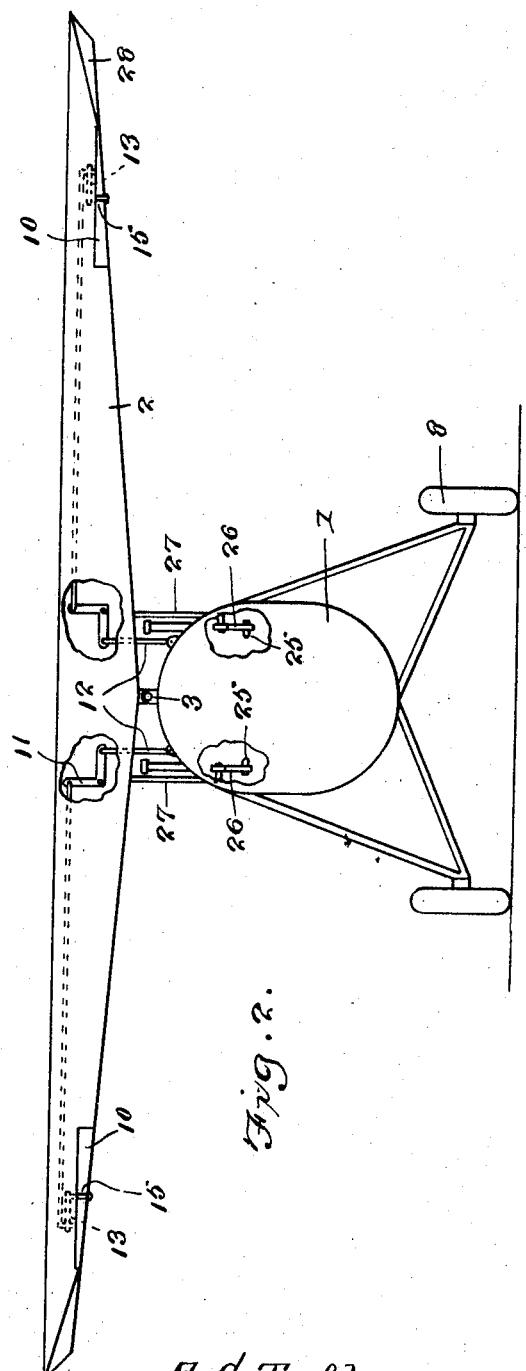
A. G. Taflan
INVENTOR
BY Victor J. Evans
ATTORNEY

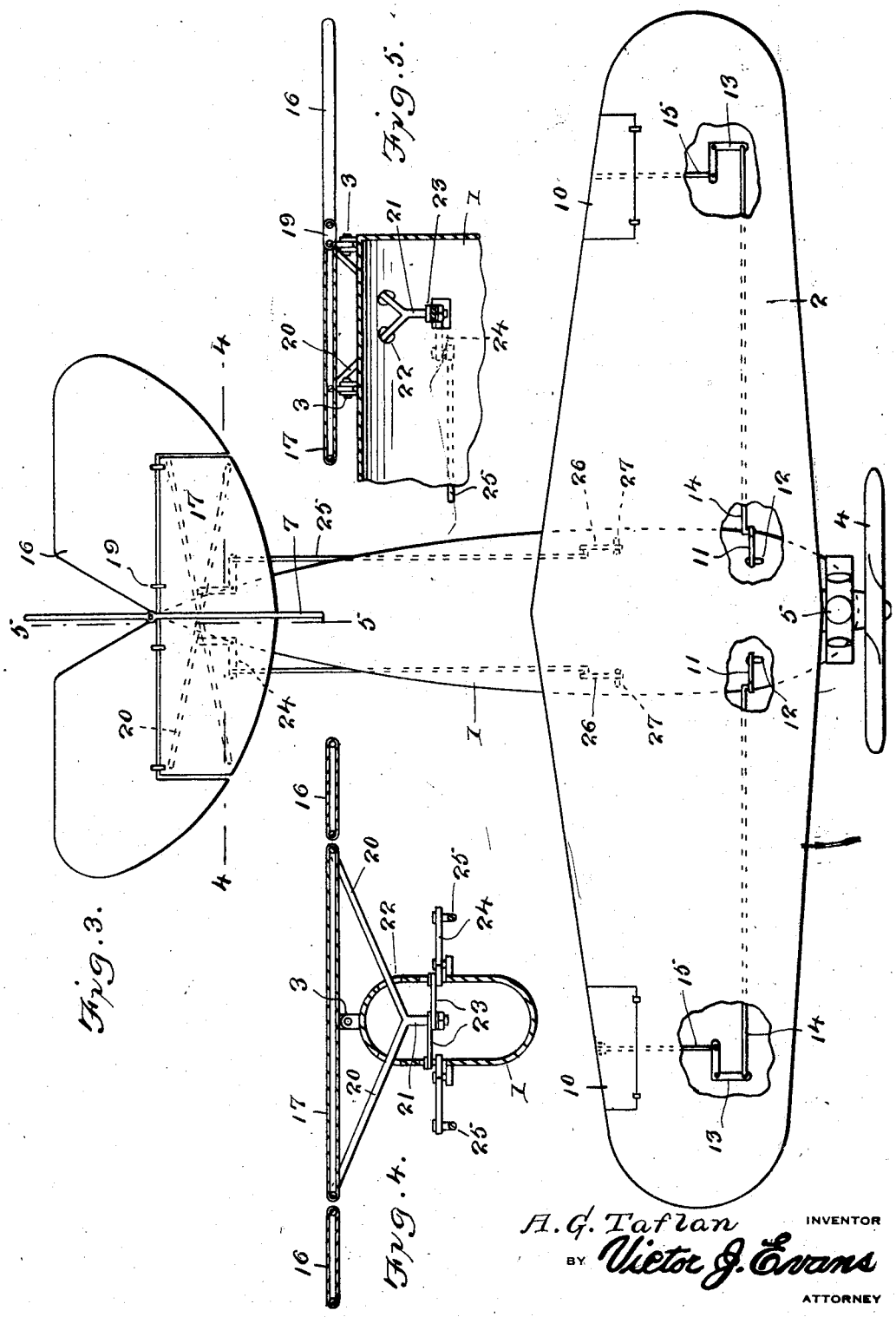

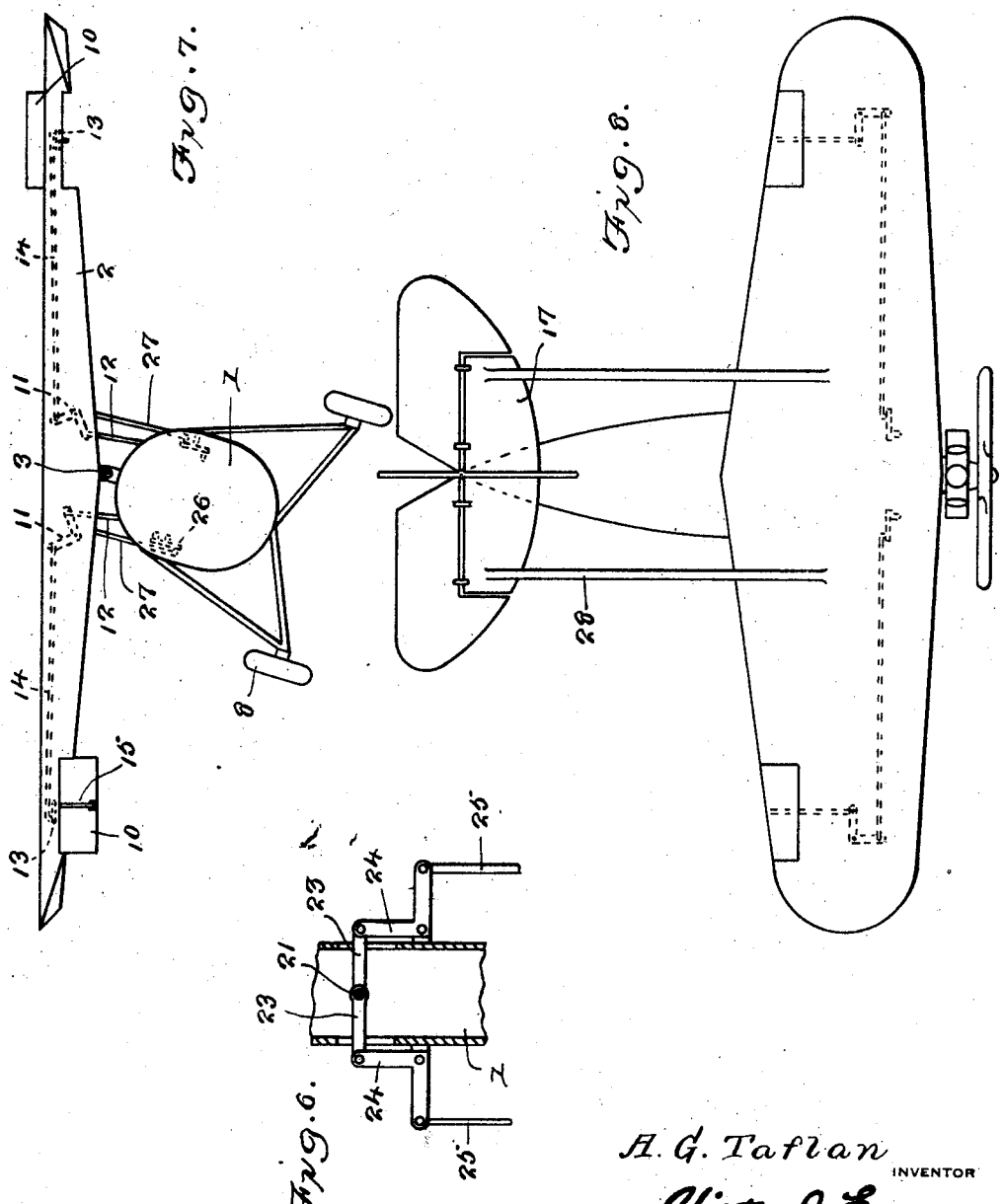

Patented Aug. 26, 1930

1,773,889

UNITED STATES PATENT OFFICE

ALEXANDER G. TAFLAN, OF DETROIT, MICHIGAN

AEROPLANE

Application filed October 25, 1929. Serial No. 402,433.

This invention relates to improvements in aeroplanes, the general object of the invention being to provide automatic lateral stabilizing means by suspending the fuselage from the wing by a pivotal connection and connecting the ailerons with the fuselage in such a manner that the tilting movement of the fuselage under the action of the vertical rudder will operate the ailerons and cause the ship to bank and turn, after which the parts are automatically returned to normal position when the rudder is moved back to its straight position, thus making it necessary for the pilot to move the vertical rudder in order to cause the ship to turn.

Another object of the invention is to provide means whereby the horizontal rudder is caused to remain parallel with the wing in all positions of the wing.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation with parts broken away, of an aeroplane constructed in accordance with this invention.

Figure 2 is a front view thereof, with parts broken away.

Figure 3 is a top plan view with parts broken away.

Figure 4 is a section on line 4—4 of Figure 3.

Figure 5 is a section on line 5—5 of Figure 3.

Figure 6 is a section on line 6—6 of Figure 1.

Figure 7 is a front view showing how the fuselage is tilted when the vertical rudder is turned and the ailerons operated by the movement of the fuselage to cause the ship to bank.

Figure 8 is a top plan view showing a modification.

In these views, the numeral 1 indicates the fuselage of the ship and 2 the wing thereof, the fuselage being connected with the wing by the pivotal connections 3 so that the fuselage can have swinging movement about a horizontal axis with respect to the wing. The propeller 4 and the power plant 5 are carried by the wing at the front center thereof and the vertical rudder 6 at the tail of the fuselage is arranged below the plane of the pivotal points 3. The usual vertical fin 7 is attached to the top of the tail part of the fuselage and said fuselage is provided with the usual landing gear 8 and skid 9. The wing is provided with the usual ailerons 10 and these ailerons are operated by the tilting movement of the fuselage under the action of the rubber 6 through means of the bell cranks 11 connected with the fuselage by the links 12 and with the bell cranks 13 by the links 14, the bell cranks 13 being connected with the ailerons by the connections 15.

Thus when the rudder 6 is turned by the pilot to make a left hand turn, for instance, the action of the wind on the rudder will cause the fuselage to tilt, as shown in Figure 7, and this movement of the fuselage will cause the right hand aileron to lower and the left hand aileron to raise through the connections shown at 12, 11, 14, 13 and 15. These positions of the ailerons will, of course, cause the wing to tilt so that the ship will bank and turn in the usual manner and as will be seen, the operation of the ailerons is automatic and the only thing necessary for the pilot to do when he wishes to make a turn is to adjust the rudder 6. As soon as the rudder 6 is moved back, the fuselage will return to its normal position and thus the ailerons will be moved back to their normal position and the ship will then fly on an even keel.

The horizontal rudder 16 is formed with a section 17 which fits in a recess 18 formed in the rudder and the two sections are connected together at the rear edge of the section 17 by the links 19. Two pairs of converging rods 20 have their outer ends connected with the ends of the section 17, the four rods having their inner ends terminating in a depending part 21. These rods pass through openings 22 in the tail part of the fuselage so that the depending part 21 is within the fuselage. Oppositely extending links 23 are pivotally connected with the depending part 21 and these links are each connected to a bell crank 24 pivoted to the tail part of the fuselage and a link or rod 25 connects each bell crank with a bell crank 26 arranged within the fuselage adjacent each side thereof, the rods 25 passing through holes in the fuselage. The bell cranks 26 are connected by the links 27 with a part of the wing, so that relative movement between the wing and fuselage will, through the connections shown, cause the rods 21 to move the section 17 and, therefore, the section 16, so that the horizontal rudder remains parallel with the wing in all positions of the wing relative to the fuselage. The manner of connecting the sections 16 and 17 together permit the section 16 to be tilted in the usual manner by the pilot.

Instead of using the connections just described for keeping the horizontal rudder parallel with the wing, I may use the rigid connections 28 between the section 17 and the wing, these connections being in the form of bars, longerons or the like and one of which is arranged on each side of the fuselage and has its ends rigidly connected with the section 17 and its other end with the wing, as shown in Figure 8.

In order to lessen the danger of side slips, I form each tip of the wing with a sloping front part 28, as shown in Figure 2, the slope extending downwardly and rearwardly from the front of the wing, with the front edge of the sloping part diagonally arranged and extending from the upper outer corner of the tip downwardly and inwardly to a point a distance from the extremity of the wing.

From the above, it will be seen that I have provided an automatic lateral stability for an aeroplane, so that it is simply necessary for the pilot to operate the vertical rudder in order to make turns, without it being necessary for the pilot to adjust the ailerons, with means for keeping the horizontal rudder parallel at all times with the wing without interfering with the tilting movement of the vertical rudder when it is desired to cause the ship to ascend or descend.

This invention acts to automatically keep the ship laterally stable while in flight, even in rough weather conditions.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An aircraft comprising a fuselage, a wing, means for pivotally connecting the top of the fuselage with the under side of the wing whereby the fuselage has tilting movement about a horizontal axis with respect to the wing, a vertical rudder at the tail of the fuselage, ailerons carried by the wing, connections between the fuselage and the ailerons whereby tilting movement of the fuselage under the action of its vertical rudder will cause operation of the ailerons to cause the ship to turn and bank, a propeller and its power plant connected with the front part of the wing, a horizontal rudder and means whereby the horizontal rudder is caused to remain parallel with the wing in all positions of the wing.

2. An aircraft comprising a fuselage, a wing, means for pivotally connecting the top of the fuselage with the under side of the wing so that the fuselage can tilt about a horizontal axis, ailerons carried by the wing, a vertical rudder carried by the fuselage, connections between the fuselage and the ailerons whereby tilting movement of the fuselage will operate the ailerons, a two part horizontal rudder, one part being pivoted to the fuselage to move about a horizontal axis, connections between said part and the wing whereby the rudder is caused to remain parallel with the wing in all positions of the wing, means for pivoting the second part to the first part whereby the second part can be tilted upwardly or downwardly and propulsion means for the craft.

3. An aircraft comprising a fuselage, a wing, means for pivotally connecting the top of the fuselage with the under side of the wing so that the fuselage can tilt about a horizontal axis, ailerons carried by the wing, a vertical rudder carried by the fuselage, connections between the fuselage and the ailerons whereby tilting movement of the fuselage will operate the ailerons, a two part horizontal rudder, one part being pivoted to the fuselage to move about a horizontal and longitudinal axis, connections between said part and the wing whereby the rudder is caused to remain parallel with the wing in all positions of the wing, means for pivoting the second part to the first part whereby the second part can be tilted upwardly or downwardly and a propeller and its power plant connected with the front part of the wing.

In testimony whereof I affix my signature.

ALEXANDER G. TAFLAN.